US007313861B2

(12) United States Patent
Schneider et al.

(10) Patent No.: US 7,313,861 B2
(45) Date of Patent: Jan. 1, 2008

(54) ELECTRIC DRIVE FOR A SHAPING DIE

(75) Inventors: Wolfgang Schneider, Fulda (DE); Uwe Schüller, Ilmenau (DE)

(73) Assignee: Siemens Aktiengesellschaft, München (DE)

( * ) Notice: Subject to any disclaimer, the term of this patent is extended or adjusted under 35 U.S.C. 154(b) by 262 days.

(21) Appl. No.: 10/792,675

(22) Filed: Mar. 3, 2004

(65) Prior Publication Data

US 2004/0216290 A1 Nov. 4, 2004

(30) Foreign Application Priority Data

Mar. 3, 2003 (DE) ................................ 103 09 249

(51) Int. Cl.
*F16H 21/18* (2006.01)

(52) U.S. Cl. ............................ 29/798; 29/283.5; 74/25

(58) Field of Classification Search .................. 29/432, 29/432.2, 505, 243.5, 524.1, 521, 798, 243.53, 29/283.5; 227/27; 403/282, 285; 74/25, 74/29, 52

See application file for complete search history.

(56) References Cited

U.S. PATENT DOCUMENTS

| | | | | |
|---|---|---|---|---|
| 3,540,246 | A * | 11/1970 | Jones, Jr. | 72/2 |
| 4,760,634 | A | 8/1988 | Rapp | |
| 5,263,627 | A * | 11/1993 | Breuer et al. | 227/17 |
| 5,566,373 | A * | 10/1996 | Seimetz et al. | 419/66 |
| 5,747,076 | A * | 5/1998 | Jaroschek et al. | 425/145 |
| 5,908,148 | A * | 6/1999 | Kochs et al. | 227/30 |
| 6,732,420 | B2 * | 5/2004 | Wang et al. | 29/525.06 |
| 6,789,309 | B2 * | 9/2004 | Kondo | 29/709 |
| 2002/0144386 | A1 * | 10/2002 | Lang et al. | 29/243.53 |

FOREIGN PATENT DOCUMENTS

| | | | |
|---|---|---|---|
| DE | 196 06 842 | A1 | 8/1996 |
| DE | 198 06 751 | A1 | 8/1999 |
| DE | 201 06 207 | U1 | 7/2001 |
| EP | 0 215 449 | B1 | 5/1991 |

* cited by examiner

*Primary Examiner*—Jermie E. Cozart
(74) *Attorney, Agent, or Firm*—Henry M. Feiereisen; Ursula B. Day

(57) ABSTRACT

A driving mechanism for operating a shaping die to join stacked plates by a deep-drawing and swaging operation is implemented as an electric drive, such as a linear motor or a rotary motor, which is operatively connected to the shaping die.

2 Claims, 1 Drawing Sheet

ELECTRIC DRIVE FOR A SHAPING DIE

This application claims the priority of German Patent Application, Serial No. 103 09 249.8, filed Mar. 3, 2003, pursuant to 35 U.S.C. 119(a)-(d), the disclosure of which is incorporated herein by reference.

BACKGROUND OF THE INVENTION

The present invention relates to an electric drive for a shaping die.

Heretofore, a plastic joining of stacked thin plates by means of a shaping die, as described, for example, in U.S. Pat. No. 4,760,634, involves the arrangement of pneumatic-hydraulic systems. These pneumatic-hydraulic systems require hydraulic lines which are under great pressure so that special connectors, adapters and tubes must be provided which require much maintenance works. Moreover, air and oil conductions must be absolutely separated from one another to ensure the quality of such joints, in particular when higher cycle rates are involved.

It would therefore be desirable and advantageous to provide an improved driving mechanism for a shaping die to obviate prior art shortcomings and to require little maintenance while still being reliable in operation to result in reproducible joints of high quality and high cycle rate.

SUMMARY OF THE INVENTION

According to one aspect of the present invention, an electric drive for a shaping die having a stem and a working tang disposed in coaxial relationship to the step and defined by smaller diameter than a diameter of the stem, for joining stacked plates or plate sections by deep-drawing and swaging superimposed flat parts of the plates in a deep-drawing opening, whereby the deep-drawn flat parts are swaged wide in two transverse directions facing away from one another and in a deep-drawing direction, while any expansion is limited, wherein the deep-drawn and swaged flat part of one of the plates extends behind the other one of the plates which, as viewed in deep-drawing direction, is positioned underneath the one plate to thereby form-fittingly interlock the plates, wherein the deep-drawn and swaged flat part of the one plate has dimensions which exceed an inner dimension of a narrowest area of the deep-drawing opening of the other plate, thereby realizing under plastic deformation a joint with an edge area extending in deep-drawing direction, wherein the deep-drawing opening has a volume which is invariable in pressing direction and transversely to the pressing direction so that the deep-drawn flat parts are prevented from expansion in longitudinal and transverse directions during the swaging operation, wherein the electric drive includes an electric machine for operating the shaping die.

The present invention resolves prior art problems by providing an electric drive for operating a shaping die to join stacked plates by a deep-drawing and swaging operation. The electric drive operates the tools, in particular the shaping die for realizing such plastic connections, directly or through intervention of mechanical or differently configured transmitting elements for force and movement conversion. The electric machine may hereby be constructed as rotary motor or as linear motor, whereby the force transmission may be realized via suitable transmission elements. Electric drives are better for controlling the force-displacement profile. As a result, i.a., less noise is generated and shorter cycle times are attained.

According to another feature of the present invention, the electric machine may have a gearbox for converting a rotating movement of the rotary motor into a linear movement of the shaping die. As an alternative, the electric machine may have a toothed rack for converting a rotating movement of the rotary motor into a linear movement of the shaping die.

According to another feature of the present invention, the electric machine may have a converting mechanism for converting a rotating movement of the rotary motor into a linear movement of the shaping die, wherein the converting mechanism includes a gearbox operatively connected to the rotary motor and having an output in the form of an eccentric, and an adjustment cylinder having one end connected off-center to the eccentric and another end connected to the shaping die.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
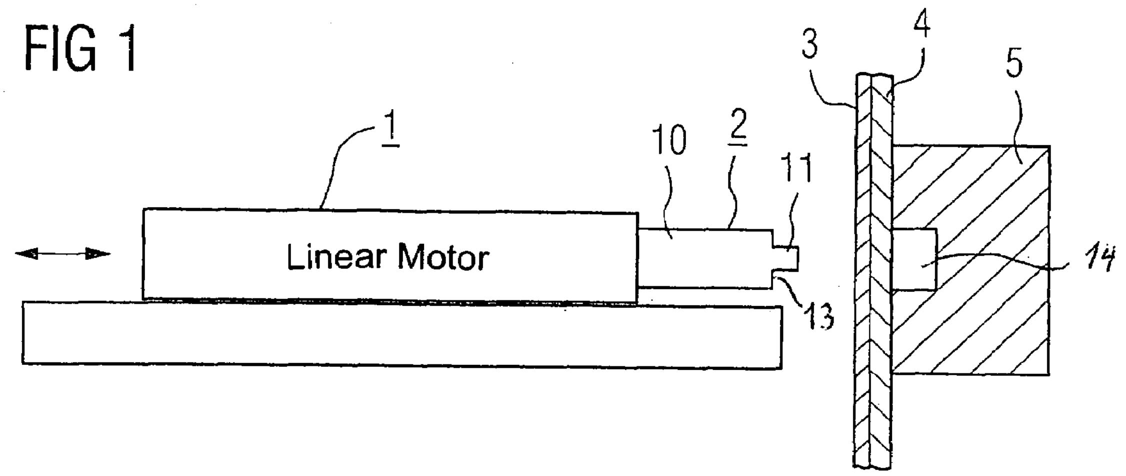
FIG. 1 is a schematic illustration of one embodiment of a driving mechanism in accordance with the present invention for operating a shaping die.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of one embodiment of a driving mechanism in accordance with the present invention for operating a shaping die 2. The driving mechanism is implemented as a linear motor 1 having a moving part which is secured to the shaping die 2. Structure and operation of a linear motor are generally known to the artisan so that a detailed description thereof is omitted for the sake of simplicity. In general, a motion between a stator and a rotor of the linear motor is linear rather than rotary.

The shaping die 2 interacts with a holder or female mold 5 for joining through plastic deformation two plates 3, 4 or plate sections, for example sheet-metal plates, which are placed in superimposed or stacked disposition on the female mold 5. The shaping die 2 has a stem 10 and a coaxially disposed working tang 11 of smaller diameter, so that a shoulder 13 is formed.

The joining of the plates 3, 4 is realized by deep-drawing and swaging superimposed flat parts of the plates 3, 4 by means of the working tang 11 into a blind bore 14 of the female mold 5, and the deep-drawn flat parts are swaged wide in two transverse direction facing away from one another and in a deep-drawing direction, while any expansion is limited.

As a result of the swaging effect, the deep-drawn and swaged flat part of the mold-distal plate 3 is stretched out to such an extent that, as viewed in deep-drawing direction, it extends behind the mold-proximal plate 4 for form-fitting interlock of the plates 3, 4. The flat part of the plate 3 has hereby dimensions which exceed the inner dimension of the narrowest area of the deep-drawing opening of the plate 4. Thus, plate material is caused to flow radially outward to establish through plastic deformation a jointed area with an edge area extending in deep-drawing direction.

A specific construction and manner in which the shaping die 2 functions for deep-drawing and swaging stacked plates is fully described in U.S. Pat. No. 4,760,634, the entire specification and drawings of which are expressly incorporated herein by reference.

Figure 2:
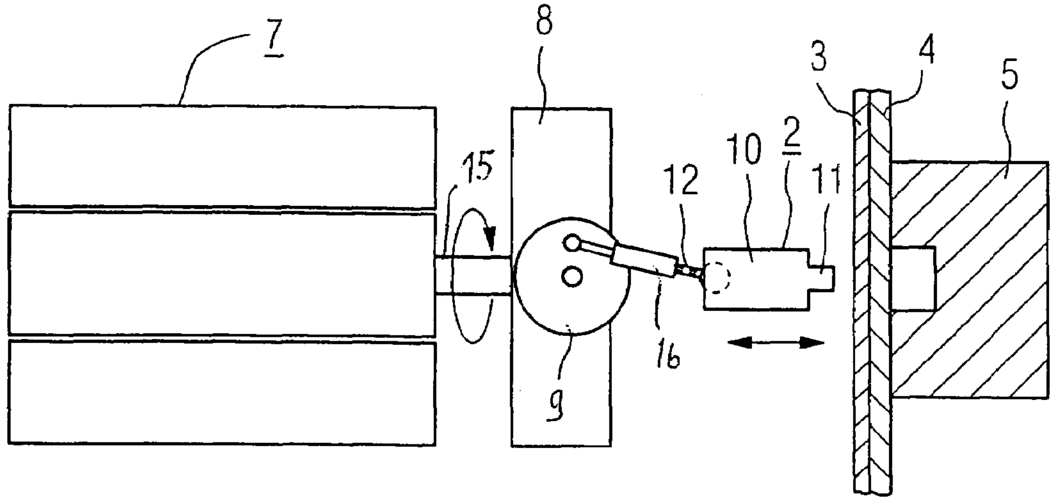
FIG. 2 is a schematic illustration of another embodiment of a driving mechanism in accordance with the present invention for operating a shaping die.

Turning now to FIG. 2, there is shown a schematic illustration of another embodiment of a driving mechanism in accordance with the present invention for operating the shaping die 2. Parts corresponding with those in FIG. 1 are denoted by identical reference numerals and not explained again. In this embodiment, provision is made for a driving mechanism which includes an electric machine in the form of a rotary motor 7, instead of a linear motor. The rotary machine 7 has an output shaft 15 which is operatively connected to a gearbox 8. An eccentric disc 9 is rotatably coupled to the gearbox 8 and cooperates with an adjustment cylinder 16 having one end mounted off-center to the eccentric disc 9 and another end formed as a threaded connecting rod 12 for threaded engagement with a rear end of the shaping die 2. In this way, a rotating motion generated by the rotary motor 7 is converted into a linear or axial thrusting motion of the shaping die 2.

Although not shown in the drawing, it is, of course, also conceivable to directly convert the rotation motion into the linear motion by means of a screw mechanism between the rotary motor 7 and the shaping die 2.

Electric drives of the type described herein are also applicable in processes in which the volume of the deep-drawing opening is invariable in pressing direction or transversely to the pressing direction, so that any expansion in longitudinal direction and transverse direction of the deep-drawn flat parts is prevented during the swaging process. The provision of an electric drive enables the application of forces that are equal to those generated by hydraulic units, while significantly reducing maintenance works and realizing plastic joints at substantially shorted cycle times.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A driving mechanism for operating a shaping die to join stacked plates by a deep-drawing and swaging operation, comprising:

an electric rotary motor; and converting means for converting a rotating movement of the rotary motor into a thrusting linear movement of the shaping die, said converting means including a gearbox operatively connected to the rotary motor and having an output in the form of an eccentric, and an adjustment cylinder having one end connected off-center to the eccentric and another end connected to the shaping die.

2. The driving mechanism of claim 1, wherein the adjustment cylinder has a threaded connecting rod for threaded engagement with the shaping die.

* * * * *